UNITED STATES PATENT OFFICE.

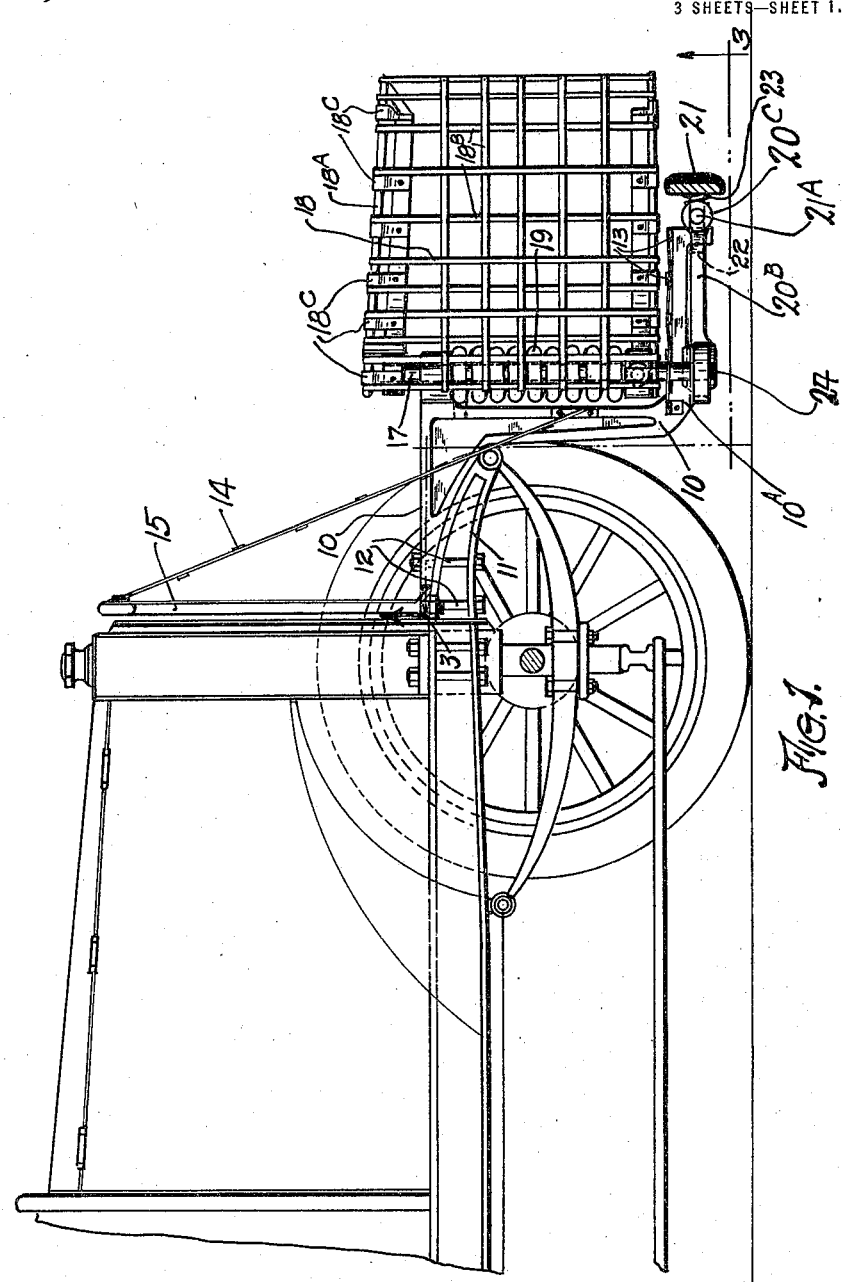

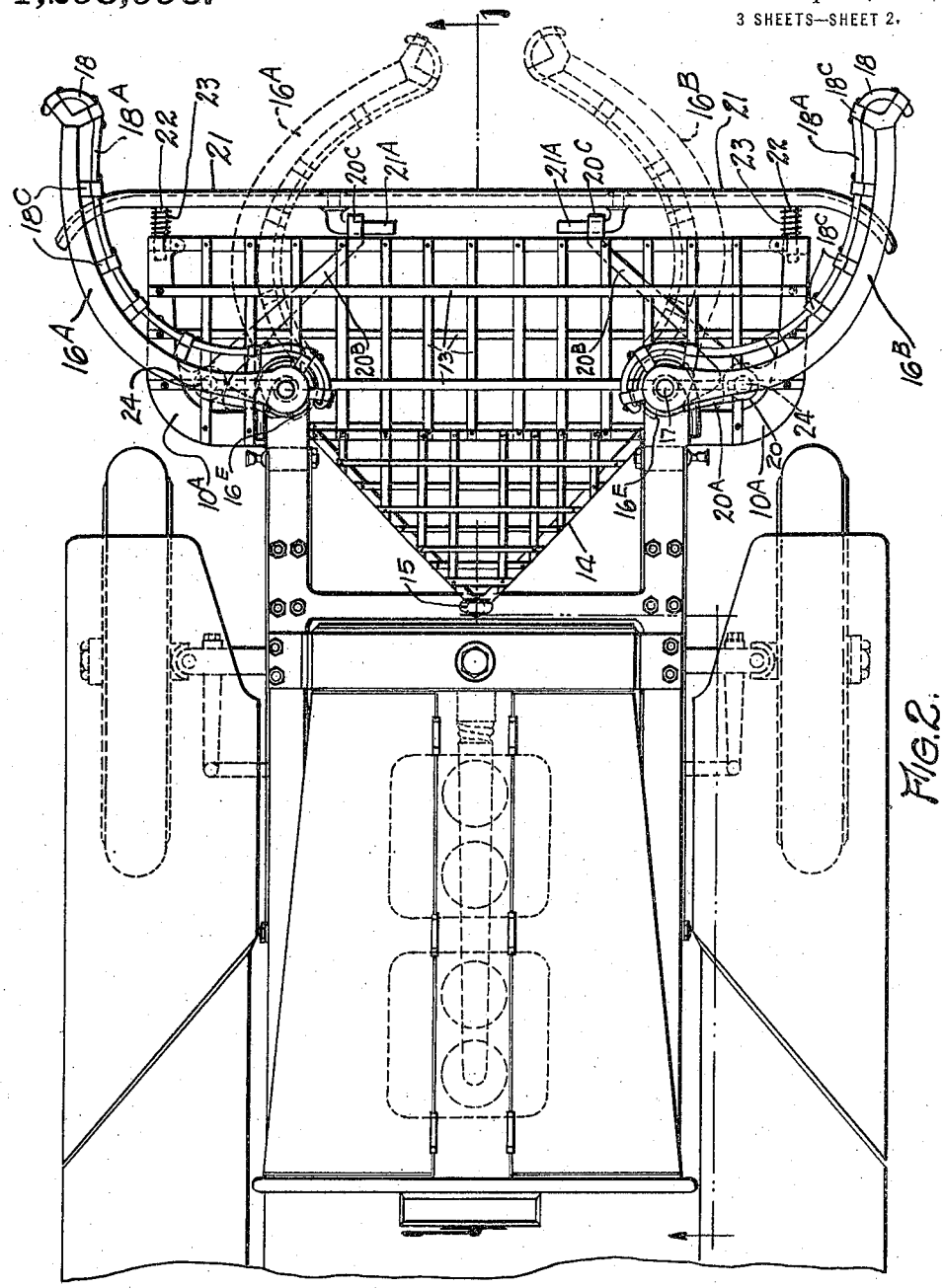

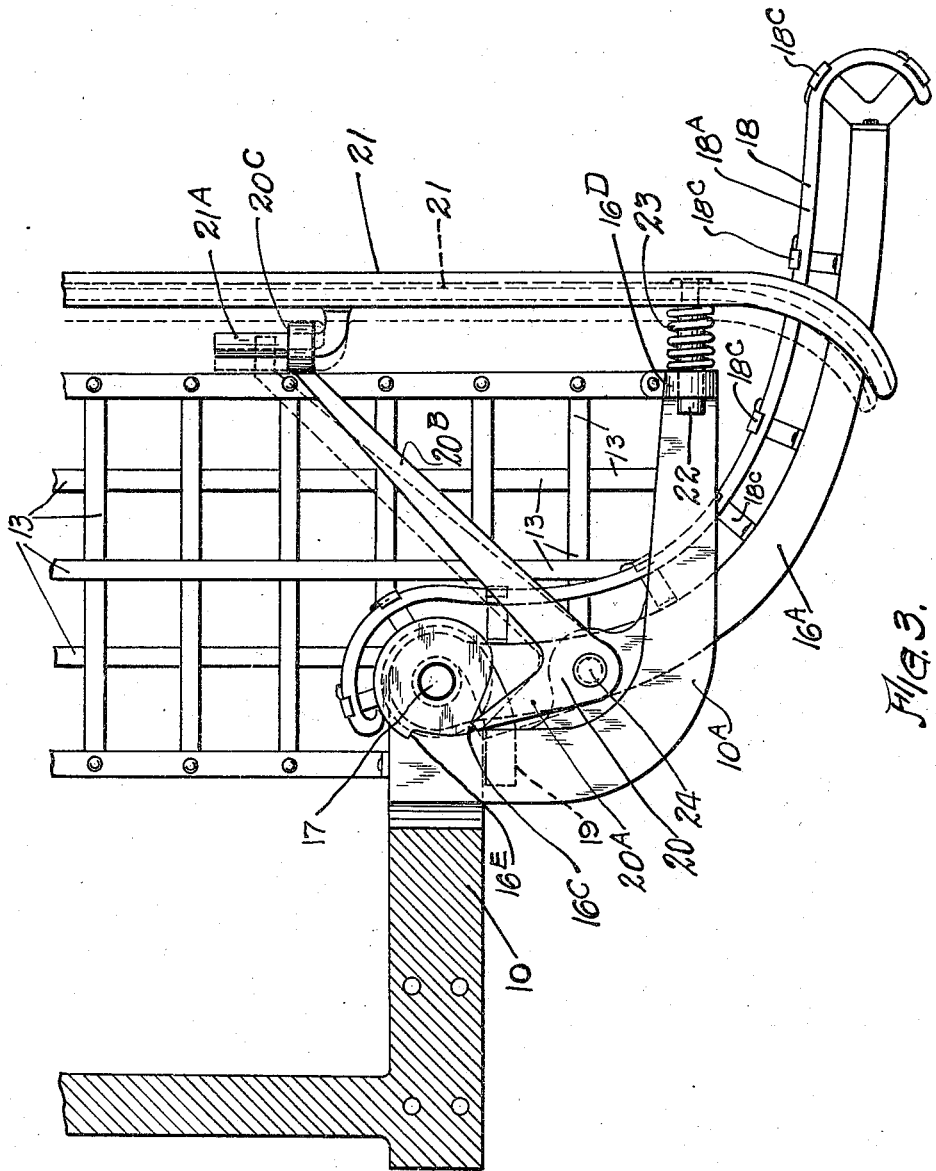

FREDERICK MILIAN, OF CHICAGO, ILLINOIS.

VEHICLE-FENDER.

1,298,996.　　　　Specification of Letters Patent.　　Patented Apr. 1, 1919.

Application filed August 1, 1917. Serial No. 183,987.

*To all whom it may concern:*

Be it known that I, FREDERICK MILIAN, a subject of the Emperor of Austria, residing in Chicago, county of Cook, and State of Illinois, have invented certain new and useful Improvements in Vehicle-Fenders, of which the following is a specification.

This invention relates generally to vehicle fenders and more particularly to automobile fenders.

One of the objects of this invention is to provide means comprising automatically operable arms carrying net-like walls preferably of interlaced leather straps, which walls will act to embrace the pedestrian coming in collision with a fender portion of the device.

With these and other objects in view my invention consists in the combination and arrangement of parts and members herein shown in the accompanying drawing and particularly pointed out in the appended claims.

Referring to the drawings, in which like reference characters indicate like or corresponding parts, Figure 1 is a sectional elevation taken on line 1—1 of Fig. 2. Fig. 2 is a plan view of the invention as applied to an automobile. Fig. 3 is an enlarged bottom view looking up on line 3—3 of Fig. 1.

Referring again to the drawings, I provide a pair of heavy cast iron frames 10 which are rigidly secured to channel frame 11 of the automobile in this case, with bolts 12. Note that in the elevation shown in Fig. 1, the frames 10, are Z-shaped and that the lower portion 10$^A$ (in plan view) extends outwardly to form a wide base for the interlaced heavy leather strips 13 which are secured thereto and form the fender bottom horizontal wall. A triangular-shaped interlaced leather guard 14 is also provided to protect against contact with the radiator. A vertical rod 15 supports the upper part of such guard 14.

The pair of parallel curved arms 16$^A$ and 16$^B$, are movably mounted on the vertical shafts 17, and support a suitable net-like guard-wall 18 consisting of the heavy rubber curved bars 18$^A$ and interlaced leather straps 18$^B$. Suitable clips 18$^C$ are provided to support the curved bars 18$^A$. Normally, the walls 18 and their supporting arms 16$^A$ and 16$^B$, are positioned as indicated by the full lines in Figs. 2 and 3, and are retained in such positions against the pressure of the coil springs 19, by means of the angularly disposed short tripper ends 20$^A$, of the pivotally mounted trippers 20, having engagement with the teeth 16$^C$ of the arms 16$^A$ and 16$^B$; thus retaining same in open position against the tension of the springs 19. The longer ends 20$^B$, of the trippers 20, are cast with an eye formation 20$^C$ adapted to receive and support the round lugs 21$^A$ extending from the release bar 21. The forward ends of the curved arms 16$^A$ and 16$^B$ are likewise, provided with eye formations 16$^D$ adapted to receive the guide bolts 22, around which are coiled the springs 23 arranged to normally maintain such release bar in the forward position, (shown by full lines in Fig. 3,) but permitting a slight inward movement (shown in dotted lines in Fig. 3,) upon contact in collision with a pedestrian to thereby release the curved arms 16$^A$ and 16$^B$ by means of the inward movement of the long tripper arms 20$^B$ which movement will cause the shorter ends 20$^A$ to move outwardly and thereby release such curved arms to permit the inward motion of same by the coiled spring 19. It will be noted that the inward movement of the arms 16$^A$ and 16$^B$ are limited by the engagement of the teeth 16$^E$ with the ends 20$^A$ of the tripper may be stated that the trippers 20 are pivotally mounted on pins 24 which extend into the lower extensions 10$^A$ of the frames 10.

From the above description it will be noted that I have provided a vehicle fender which is comparatively simple in construction and positive in operation.

I claim:

1. The combination with a vehicle, of a fender comprising a stationary base, a pair of pivotally mounted side walls, resilient means comprising coiled springs concentric with the pivots of said walls for moving said side walls, trippers arranged to retain said walls in the extended open position, and a release bar supported on said base and arranged to move said trippers to release said arms.

2. The combination in a vehicle fender of a pair of frames, a stationary interlaced web extending between said frames, an upwardly disposed triangular interlaced web, a pair of pivotally mounted arms, an interlaced wall supported on each of said arms, resilient means comprising coiled springs concentric with the pivots of said arms tending to move said arms toward each other, a pair of trippers mounted to retain said arms and walls in extended positions against the action of said resilient means, and a release bar supported on said base adapted to actuate said trippers to release said arms and walls to permit an inward movement of same.

In witness whereof, I have hereunto subscribed my name this sixteenth day of July, 1917.

FREDERICK MILIAN.

Copies of this patent may be obtained for five cents each, by addressing the "Commissioner of Patents, Washington, D. C."